United States Patent [19]
Wilkinson et al.

[11] Patent Number: 5,297,129
[45] Date of Patent: Mar. 22, 1994

[54] WAVEFORM SHAPING METHOD AND APPARATUS FOR OPTICAL RECORDING

[75] Inventors: Richard L. Wilkinson, La Mirada; Stephen P. Brown, Santa Ana; Shigang Li, Norwalk, all of Calif.

[73] Assignee: Optical Disc Corporation, Santa Fe Springs, Calif.

[21] Appl. No.: 996,729

[22] Filed: Dec. 24, 1992

[51] Int. Cl.⁵ .............................................. G11B 7/00
[52] U.S. Cl. ................................. 369/116; 369/124; 369/59
[58] Field of Search ................ 369/116, 59, 124, 109, 369/111, 54

[56] References Cited

U.S. PATENT DOCUMENTS

| | | |
|---|---|---|
| 4,225,873 | 9/1980 | Winslow ............................... 369/54 |
| 4,616,356 | 10/1986 | Wilkinson et al. .................. 369/116 |
| 4,866,692 | 9/1989 | Saito et al. ........................... 369/111 |
| 4,961,182 | 10/1990 | Saito et al. ........................... 369/124 |
| 5,218,591 | 6/1993 | Shimamoto et al. ................. 369/116 |

*Primary Examiner*—Paul M. Dzierzynski
*Assistant Examiner*—Kiet T. Nguyen
*Attorney, Agent, or Firm*—Ladas & Parry

[57] ABSTRACT

Method and apparatus for improving the characteristics of the surface effects recorded on an optical disc, for use with an optical recording apparatus which includes a writing light beam source and an optical modulator for modulating the intensity of the writing beam of light above and below a threshold level of a moving recording medium in response to a modulator drive signal for recording information on the medium, the light beam being capable of forming a track of surface effects or indicia in the moving recording medium when the writing beam is above threshold and incapable of forming surface effects in the moving recording medium when the writing beam is below threshold. The method includes receiving a substantially rectangular waveform having leading and trailing edges, provided as a modulator drive signal to modulate the writing beam to a peak power above threshold and to a minimum power level below thresholds, respectively, and producing a shaped modulator drive signal by increasing the peak power of the writing beam responsive to the occurrence of the leading edges, by decreasing the time the shaped modulator drive signal is above threshold in order to maintain a prescribed duty cycle in the track of surface effects in the moving recording medium, and by producing symmetrical leading and trailing edges of the surface effects.

24 Claims, 3 Drawing Sheets

FIG. 1
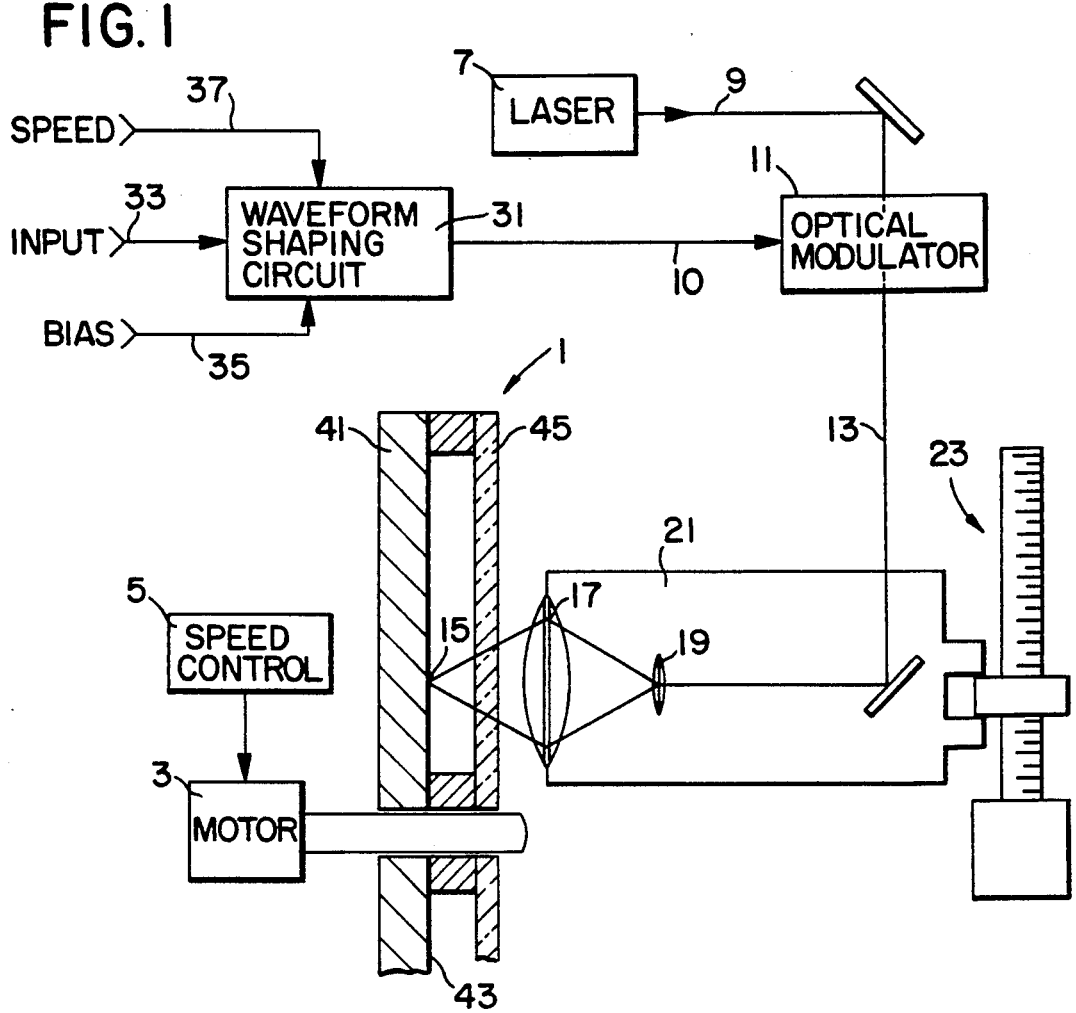
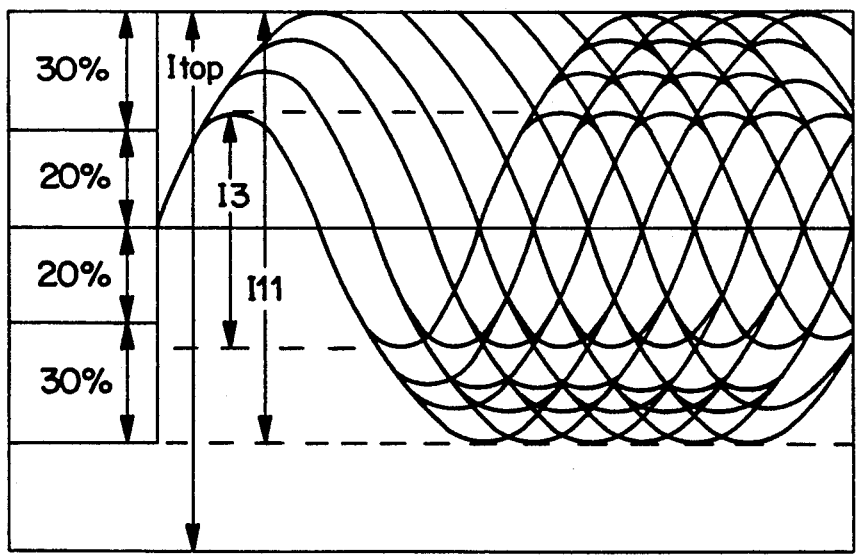
FIG. 2

WAVEFORM SHAPING METHOD AND APPARATUS FOR OPTICAL RECORDING

BACKGROUND OF THE INVENTION

1. Field of the Invention

The present invention relates to the field of signal processing systems, and in particular to the field of waveform shaping in optical information recording systems. More specifically, the present invention relates to a waveform shaping system for improving resolution of the recorded indicia in an optical disc while overcoming duty cycle and asymmetry problems associated with prior art techniques.

2. Brief Description of the Prior Art

A great many systems are known for optically recording information on light responsive media. Digital information as well as analog information can be recorded on a variety of media, including photoresists, photochromic materials, and thermally responsive materials in the form of discs, drums, and tape.

Virtually all of these known systems employ some form of pulse code modulation (PCM) or frequency modulation (FM) due to the nonlinearities of known optical recording media. Additionally, virtually all of these known systems employ an optical system including an objective lens for focusing the writing beam of light to a small spot on the light sensitive surface of the medium. In order to maximize the information density of the recorded material, it is necessary to focus the writing beam to the smallest possible spot size. Due to diffraction effects, a focussed beam of coherent radiation forms a central bright spot surrounded by concentric spaced rings of light known as an Airy disc, having an approximately Gaussian power distribution. The diameter of the central spot of light is defined by the wavelength of the recording light and the numerical aperture (NA) of the objective lens.

Most optical recording media exhibit a threshold effect, meaning that a level of writing beam power density exists above which the medium will be altered, and below which the medium will not be altered. Since the power density of the focussed writing beam varies as a function of the distance from the center of the central spot, it is possible to form altered areas on a medium which are smaller than the diameter of the central spot of the focussed light. In order to obtain an altered area of a specific size, the prior art has taught that it is merely necessary to adjust the peak intensity of the modulated beam such that the power density of the focussed spot at the specified diameter is equal to threshold level of the recording medium. Experimental results indicate that this technique works extremely well when there is no relative movement between the writing spot and the medium and no thermal conductivity effects diffusing the energy absorbed by the medium. In all practical systems, however, relative movement between the medium and the recording spot is necessary. This relative movement greatly complicates the calculation of the amount of energy absorbed by a particular region of the medium.

All light responsive media exhibit a tendency to integrate the amount of energy received over a period of time, so that the threshold level of the material does not define a specific instantaneous power density at which the material is altered, but rather defines an energy density which is the result of an integration of the received power over the time during which the power is received. In other words, the threshold level for the materials is actually an exposure level. Exposure level is defined as the radiant flux per unit area integrated over the exposure time. The radiant flux irradiating a particular point on the medium at a particular time is a function of the position of the point within the focussed spot, as well as the instantaneous intensity of the writing beam. Specifically, the exposure level at a particular point on the medium is equal to the convolution integral of the instantaneous power of the modulated writing beam as a function of time and the power density distribution function defined by the path and speed of the particular point of the medium through the focussed spot, evaluated over the exposure time. Since the power distribution of the focussed spot varies in two dimensions, the exposure level over the medium defines a three dimensional graph. The intersection points of this graph with a planar "slice" through the graph at the altitude corresponding to the threshold level of the medium maps the boundaries of the altered areas on the medium.

An important concept in determining the effect of the finite size of the recording spot is the concept of the spatial frequency of the information on the moving recording medium. This is the subject of U.S. Pat. No. 4,616,356 which is incorporated herein by reference.

Also incorporated herein by reference is U.S. Pat. No. 4,225,873 describing signal processing techniques to achieve proper duty cycle of the recorded information and to minimize second harmonic distortion of the recorded information which are related parameters and which are improved by the present invention. In this description, the duty cycle of the recorded information will be referenced in detail, it being understood that second harmonic distortion is proportional thereto. That is, when duty cycle is controlled to approximately 50%, this minimizes the second harmonic distortion of the recorded information.

As previously indicated, when recording on a medium using laser light, the effects of the recording process may either be an ablation of the recording surface, a discoloration of the surface, a photo-hardening or a photo-softening of a photoresist coated surface, a raised bump or bubble formation, and the like. In all cases, a recording medium is moving relative to an impinging light beam, and the energy of the light beam is increased and decreased about a threshold level so as to cause or not cause the desired effect, respectively. Also in all cases, when the light beam is first turned on or caused to exceed threshold, the full effect of the energy on the recording surface is not instantaneously realized. Rather, and especially with mediums that are thermally responsive, the recorded effect (i.e. indicia) increases with time due primarily to the temperature of the medium increasing with time under the influence of the applied energy. That is, when the light beam is first turned on, instantaneously no alteration in a moving recording surface can be detected. If left on continuously, the full effect of the impinging light beam will cause a wide stripe of the effect on the recording surface, thereby defining a broadening of the track of the light beam with the passage of time.

On the other hand, when the light beam is turned off or falls below threshold level, the effect of the lack of sufficient energy from the light beam is almost immediately recognized by the disc surface, since the downstream portion of the disc is cold and unaltered. Accordingly, when the light beam is turned off quickly, an almost instantaneous stoppage of the recording effect takes place, and since the light beam is substantially circular at the point of impingement on the recording surface, a rather blunt end on the trailing edge of the recorded indicia can be observed.

If the moving recording surface is therefore impinged by a light beam having a sharp rising leading edge and a sharp falling trailing edge, a rather "pear-shaped" or "teardrop-shaped" surface effect will be noted, the leading edge being tapered and widening to a constant width until the beam was shut off, at which point the recorded effect would define a rounded or blunted trailing end.

While the aforementioned characteristics of the recorded surface results regardless of the recording "effect" chosen, for ease of discussion in this description, it will be assumed that the recording light beam causes an ablation of the surface, thereby producing a "pit". It is to be understood, however, that a bump, discoloration, photoresist hardening, photoresist softening, or other indicia can be substituted for the term "pit" without departing from the nature of the technical description of the recording effect. It is further to be recognized that the term "pit" as used herein would be equivalent to the bump or pit formed after development of a photoresist if that were chosen for the recording surface. Finally, the term "recording surface" refers to that part of the disc which is sensitive to the impingement of light energy, whether it be on the outer surface of the disc or submerged beneath the surface being impinged by the light beam.

One of the most important parameters in the recording of a CD (Compact Disc) master is the precise control of the pit-to-land ratio. Each transition from land to pit and vice versa marks a zero crossing of the EFM (Eight-to-Fourteen) signal; therefore, the size of the land area holds as much digital information as the size of the corresponding pits. The ratio of pit to land size is the "duty cycle" of the recording. A duty cycle of 50% would represent a symmetrical signal with pits occupying 50% of the track area and land area the other 50%. Any recording that deviates from a 50% duty cycle would be represented in an eye-pattern (discussed in connection with FIG. 2) as an asymmetrical signal. Due to limitations in the replication process, differences in the various CD player's optics, and variances in the players electronic boost, all CD recordings, even ones that were recorded with perfect 50-50 symmetry, may be seen by the playback electronics as slightly asymmetrical. Circuitry within the CD player corrects for this asymmetry by shifting the "zero level" to a point where no timing differences between positive and negative half cycles exist on average.

The optical head of a player "reads" the information on a disc by focussing a laser beam to a spot about 1 micron in diameter and scanning this spot along a spiral track of pits and lands on the disc. The lands reflect most of the light back to a photodetector in the head, but the pits reflect very little light. The photodetector generates an electrical signal proportional to the amount of light reflected by the area of the disc illuminated by the spot. Because the spot is diffraction limited and is only slightly smaller in diameter than the length of the shortest length pit on the disc, the rise and fall times of the electrical signal are relatively rather slow, and the amplitude of the signal representing the smallest pits is smaller than the amplitude of the signals representing the longer pits. The difference in amplitude varies from player to player because of differences in optical quality, and from disc to disc because of pit geometry. All players partially make up the difference in amplitude with an analog aperture compensation circuit which boosts the amplitude of the high frequency signals relative to the low frequency signals. Unfortunately, in the interests of economy, these boost circuits are not phase linear, so the harmonics of the signals are delayed by varying amounts, and the shape of the waveform is altered in addition to its amplitude.

The EFM signal recorded on the disc is a run length limited digital code which is self clocking and contains its digital information in the timing between transitions. On the disc, such transitions are the boundaries between pits and the lands between pits. Therefore, the length of each pit is a quantum of data and the length of each land between pits is also a quantum of data.

The rules for the EFM code according to CD standards require that each and every transition occur at one of nine allowed times after the last transition. More specifically, the period between any two transitions must be nT, where T is a fixed period of time (about 231 nanoseconds) and n is an integer between 3 and 11. In order to decode the information, the player must decide how many T's pass between each transition. The rate of rotation of the disc under the playback head is not stable enough to simply time the transitions with a fixed clock. Instead, a channel clock running at an average of one cycle per T (4.3218 Mhz) is phase locked to the recovered signal. This PLL (phase locked loop) operates by comparing the timing of each transition in the signal with the closest cycle end of the clock. If the transition consistently occurs just before a cycle end of the clock, the clock slowly speeds up until the transitions occur exactly at a cycle end.

Unfortunately, the rise and fall times of the analog signal from the disc are several T long, so a specific voltage must be chosen to define the instant of the transition. This voltage is the player's "Decision Level". The player chooses this level with the help of another rule of the EFM code which states that, on the average (and ideally), the EFM signal will be "high" for exactly the same amount of time, on average, that it is low. Knowing this, if a player picks a decision point too high in voltage, the EFM signal will be low (lower than the decision point) more often than it is high (higher than the decision point). A servo loop in the player slowly adjusts the limit voltage to find and maintain the proper decision level voltage.

It is important to realize that the player cannot change its decision level on a cycle by cycle basis, but the period between the transitions can vary from 3T to 11T instantly. Any frequency dependent influences on the shape of the waveform may cause the ideal decision point for the high frequency segments of the signal to be at a different voltage than the ideal decision point for the low frequency segments of the signal. The player will choose a decision point which is an average of these voltages. As mentioned earlier, the boost circuitry of the player is not phase linear and therefore causes a "spread" in the ideal decision point voltages with frequency.

In order to read the signal from the disc, the player must keep the small spot of light centered over the moving spiral track of pits on the disc. Various techniques are used for detecting the position of the spot relative to the track, and tracking devices of some players (using single-beam or push-pull trackers) are greatly influenced by the average duty cycle of the pits along the track. That is, these players will only reliably follow along the center of the track if the track consists of a certain percentage of pit area greater than the non-pit area (a duty cycle greater than 50%). While recorded intelligence information is contained in both the pits and the lands, no tracking information is contained in the lands which are coplaner with the other unrecorded regions of the disc surface, i.e. the surface of the disc between tracks of pits. Accordingly, the greater the length of the pit relative to the land between pits, the better the tracking subsystem works. As indicated, with any duty cycle less than about 50%, there is insufficient tracking information to enable push-pull trackers to stay on track. One solution to this dilemma, then, would be to increase the pit-to-land duty cycle to above 50% and rely upon the player's ability to readjust its "decision level" to compensate for the increase in recorded duty cycle. However, in order for the player's PLL to maintain a channel clock based on the EFM signal, the increase in the duty cycle must be uniform over the entire signal, but this does not happen because there is not an equal proportional increase in pit length over the nine different pit sizes (3T to 11T). A 3T pit will obviously have a greater geometric increase, percentage wise, than will a 6T or an 11T pit. Unfortunately, therefore, departing from a 50% duty cycle just to accommodate single-beam trackers sacrifices symmetry, and if asymmetry is too great, the player's phase lock loop may not be able to lock to the recovered signal.

Another consideration which has heretofore not been adequately provided for in the recording process is the fact that single-beam players whose tracking function depends on the amount of light deflected back to the photo-sensor in the direction of the tracking error operates best with tapered (pointed) ends on the pits formed in the recording surface. The ideal pit would be an elongated groove with an apex on the bottom of the pit, similar to the impression that would be made by an upside down pyramid. The more the slope of the sides and the more tapered the ends, the better. Accordingly, any attempt to improve the pit definition tends to create a flat plateau region and eliminate the long narrow and tapered leading edges of the pits making tracking more difficult for such single-beam players. Moreover, pit length varies greatly pit-to-pit, i.e., from 3T to 11T, and a 3T width pit or land can be placed directly adjacent to an 11T pit or land. If the peak power level is increased to produce rounded (less tapered) higher definition 3T pits, the same peak power level applied when forming an 11T pit would produce a very wide or blunted trailing end portion. This difference in geometry between 3T and 11T pits creates differential symmetry where the 3T pits have one symmetry and the 11T pits have another symmetry configuration, and this causes problems with player decoders. Ideally, there should be the same symmetry on each pit size. Otherwise, there will be a "spread in pattern" in the eye-pattern (discussed in connection with FIG. 2).

It can therefore be appreciated that without the background knowledge discussed above, a simplistic master recorder design would simply maintain a 50% duty cycle in the recorded information. In the ideal world, this would seem to be an obvious thing to do, since maintaining a 50% duty cycle would appear to be an essential requirement for the recording process. Methods and apparatuses of the distant prior art have thus merely provided a rectangular waveform in which the portion representing an nT length pit is equal in length to that portion of the waveform representing an nT length land between pits.

With experience, it has become evident that many factors must be considered in order to produce the optimal track of pits on the disc. For example, since the width of a pit along the track varies with the amount of time the beam is allowed to impinge on the surface, pit size and geometry is a function of surface speed—an important factor for discs recorded in a constant angular velocity format. Other factors to be considered, already discussed, are duty cycle (>50%), the shape of the side walls of the pits in elevation (important for single-beam trackers), symmetry, and pit resolution.

Pulse length can be increased to raise the duty cycle, but this increases asymmetry. Increasing the power level of the modulated light beam improves resolution at the leading edge and increases duty cycle but produces "pear-shaped" trailing edges and excessive asymmetry. Increasing peak power at the leading edge by using a stepped modulator driving pulse improves resolution of the leading edge but requires a reduction of pulse length to keep the duty cycle under control. Doing so gives unequal symmetry for the different pulse lengths and requires an adjustment for each surface speed for best results. Threshold can be lowered to increase duty cycle, but this produces poorer resolution in the leading edges of the pits and ill-defined pit widths exhibiting substantial difference in geometrical shapes between a 3T and 11T pulse length. Finally, any attempts to increase pit resolution inherently diminishes the ability of single-beam trackers to track.

It can thus be appreciated that, while many adjustments of the parameters affecting the timing and geometry of the pits are available, the interaction by making any adjustment which affects other parameters is a tremendous problem which reduces yield and requires constant attention by a recording operator.

There is therefore a need in the art for a method and apparatus for driving the light modulator with a pulse which permits independent control over geometry and asymmetry over wider ranges than heretofore possible. The method and apparatus permits adjustment of pulse length and power to optimize asymmetry and permits adjustment of the slope of the trailing edge of the pulse to keep the geometry correct. This rather independent control of these parameters are extremely important when considering that for any given process for manufacturing discs, taking into account the differences in chemicals, surface thicknesses on the disc, molding machines, and mastering machines, any particular system would require a different adjustment to obtain optimal pit geometry and asymmetry, and the prior art has failed to provide this flexibility by being unable to control certain parameters independently. The present invention therefore satisfies a long need in the art for a method and apparatus which not only can permit optimal adjustment of the modulator driving pulse for a particular system but can also be adjustable to account for differences system-to-system. A synergistic effect is realized in the ability to produce elongated ellipse-shaped pits, i.e. pits with tapered ends, and yet maintain reasonably high resolution and required duty cycle, giving the benefit of improved tracking as well as improved signal recovery.

SUMMARY OF THE INVENTION

The invention provides a uniquely shaped modulator drive signal for use in an optical recording apparatus by providing a waveform processing means which receives a rectangular wave from the EFM processor otherwise provided as a modulator drive signal to modulate the light beam, and produces therefrom a shaped modulator drive signal having steep leading edges reaching a first level sufficient to cause the writing beam to have an intensity above the threshold of the moving medium, and having ramped trailing edges changing in amplitude at a prescribed rate to reach a second level sufficient to cause the writing beam to have an intensity below the threshold of the moving medium.

In this manner, the amplitude of the steep leading edges of the shaped modulator drive signal represent increased peak recording power, while the selection of the point at which the slope of the trailing edges passes threshold relative to the steep leading edge sets the duty cycle of the recorded indicia (pits), and simultaneously prevents the trailing edges of the indicia to be wide and blunt. Due to the steep leading edges versus the ramped falling edges of the shaped modulator drive signal, the shaped pits have substantially symmetrical geometric configurations at their leading and trailing edges. Moreover, if the amplitude of the steep leading edges of the shaped modulator drive signal is controlled properly, this can provide "canoe-shaped" pits which provide good tracking for single-beam tracking systems without upsetting asymmetry insofar as the half amplitudes of the leading and trailing edges are concerned. Since the trailing edges of the shaped modulator drive signal fall according to a prescribed ramp function, the temperature of the medium does not drop as abruptly as it would with steep falling edges of prior art modulating drive pulses, and the trailing edges thus also exhibits the "canoe-shaped" characteristic.

The waveform shaping circuit according to the present invention includes means for varying the amount of time the waveform is above threshold and the amplitude and DC level (bias) of the waveform, as well as means for varying the slope of the ramped trailing edges of the shaped modulator drive signal.

BRIEF DESCRIPTION OF THE DRAWINGS

These and other features and advantages of the present invention will be apparent from the following description of a particular embodiment of the invention, having reference to the attached drawings in which:

FIG. 1 is a generalized block diagram of a recording apparatus employing the waveform shaping circuit according to the present invention;

FIG. 2 is a representation of a perfectly symmetrical eye-pattern according to CD standard specifications;

DETAILED DESCRIPTION OF THE PREFERRED EMBODIMENT

Figure 3:
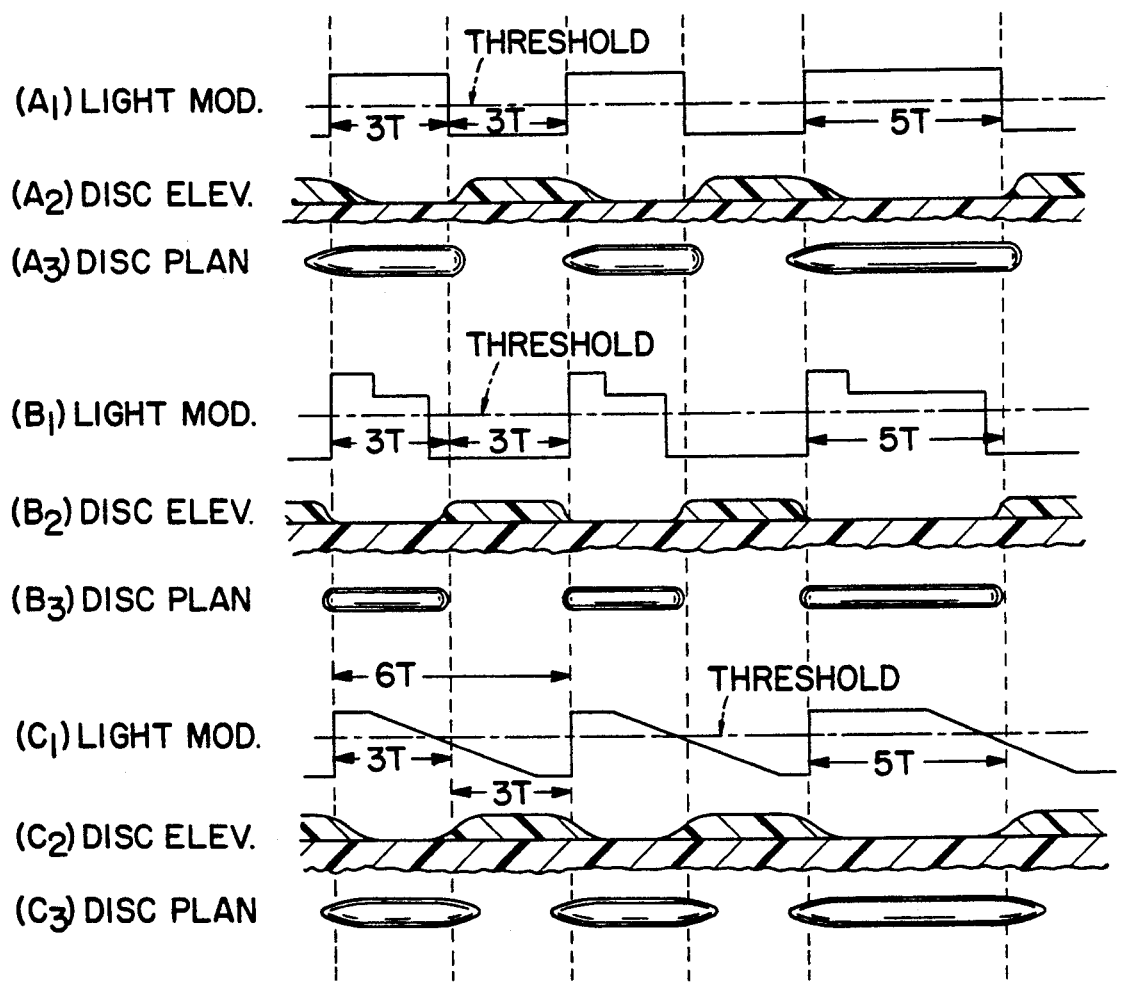
FIG. 3 is a set of waveforms and disc geometry representations showing the effects of modulating signals including rectangular, stepped, and ramped modulator drive signals.

The diagram of the recording apparatus of FIG. 1 includes only those features of the apparatus which are pertinent to the novelty of the present invention. For a description of a complete optical recording apparatus, reference is made to the aforementioned U.S. Pat. No. 4,225,873.

The recording apparatus of FIG. 1 is designed for recording information on a rotating disc-shaped medium 1. The disc is rotated by a spindle motor 3 which is controlled by a speed controller 5. Naturally, the medium could be in the form of a drum, a card, or a linear tape with the necessary modifications of the media moving systems being obvious to a skilled artisan.

A laser or similar high intensity light source 7 forms a writing beam 9 of a particular wavelength of light. The writing beam passes through an optical modulator 11 which varies the intensity of the writing beam in accordance with a drive signal on line 10. By way of example, the modulator 11 may be an accousto-optical modulator.

The beam 13 exiting the modulator will have an amplitude of modulation proportional to the amplitude of the drive signal and will have an average intensity controlled by the DC offset of the drive signal and the intensity of the unmodulated beam 9.

The modulated beam 13 is directed to the recording medium 1 and is focused to a spot 15 by appropriate optics. These optics preferably include an objective lens 17 and a beam expanding lens 19 which spreads the beam from the modulator to fill the aperture of the objective lens 17. In the disclosed embodiment, the lenses 17 and 19 are mounted on a carriage 21 to allow radial movement of the spot 15 relative to the disc 1. Naturally, various other arrangements are possible for moving the spot 15 relative to the medium, including the movement of the spindle motor. In the disclosed embodiment, the carriage is moved by a transnational drive system 23.

The drive signal for the optical modulator 11 is formed by a waveform shaping circuit 31. The waveform shaping circuit includes an input 33 for receiving the information to be recorded and may also include an input 35 for receiving a drive signal bias control for adjusting the average intensity of the modulated beam 13. If the speed of the information medium relative to the focussed spot 15 is not constant, the signal processing system may include an input 37 for receiving a signal indicative of the instantaneous relative speed.

The recording medium 1 may include a substrate 41 and a light responsive recording layer 43 coated on the substrate. A transparent member 45 may be interposed between the recording layer 43 and the objective lens 17 to prevent dust and other contamination from settling on the recording layer. Alternatively, the recording layer maybe formed on the inner surface of the member 45.

FIG. 2 is a representation of a perfectly symmetrical "eye-pattern" which would be readily understood by one skilled in the art and is presented here merely to show the necessity for controlled asymmetry in the recovered signal in the player. The diamond-shaped formations along the horizontal center line shows perfect zero crossover of all waveforms. Producing the idealized "eye-pattern" as shown provides for the greatest immunity to noise. If, for example, the 13 waveform (representing a 3T length pit or land) were asymmetrical, i.e. the pit and land are not equal in length, a shift in one of the half cycles of the I3 waveform would occur at the zero crossover point. If other waveforms also were asymmetrical to the point where it would be impossible along the horizontal center line of the graph of FIG. 2 to distinguish one nT signal from another nT signal, an improper signal would be recovered from the played disc and the phase lock loop may not be able to lock to the signal, thereby losing the self-generated clock and destroying the integrity of the played back signal, or such asymmetry could result in detecting the edges of the pits falling in the wrong cell created by the clock, again with disastrous results.

FIG. 3 illustrates the resulting geometry in the pits formed on the surface of a moving recording medium using a rectangular drive pulse, a stepped drive pulse, and a ramped drive pulse, the latter being the preferred waveform and being the subject of this invention.

The standard electrical output of the EFM processor for CD mastering is a rectangular wave with a duty cycle average of about 50%, in spite of pulse-to-pulse variations in duration from 3T to 11T. This is shown on Line A1 of FIG. 3 depicting a series of 3T segments and a long 5T segment at the end. Since the writing beam diameter is only slightly larger than the width of the pit that will be made in the recording medium surface, and recalling that some formation of the pit occurs on either side of the center point of the light beam, it can be appreciated from FIG. 3 on Line A2 that the pit in the disc begins to be formed prior to the point indicated by the rising modulator waveform due to the distribution of light about the center point of the light beam as described earlier. Also as described earlier, the shape of the pits in plan view, as seen at A3 is pear-shaped or teardrop-shaped, i.e. it has a tapered leading edge and a blunt trailing edge for the reasons given in detail above.

In the center of FIG. 3 is shown one prior art attempt to improve the resolution of the pit on the disc surface by increasing the amplitude of the modulator drive signal at the leading edge of the drive signal as shown in Line B1, the highest level corresponding to a light beam power greater than that used to form the pits shown in Line A3. If the entire width of the pulse in Line B1 were at the higher level, the trailing edge of the pit would be excessively wide. To prevent this, the stepped modulator drive signal B1 is reduced to normal power level at about 1T and continues at that level until it steps down at its trailing edge. The timing of its trailing edge is purposely foreshortened to compensate for the increased length of the pit due to the higher-than-normal power level. The shaped modulator drive signal B1 therefore accomplishes the goal of providing a higher resolution pit while maintaining an approximate 50% duty cycle and providing the pulse with good symmetry.

On the other hand, as stated earlier, blunt ends on the pits make tracking difficult for some players, and thus the proposed solution by waveform B1 solves one problem but causes another. That is, the tapered end on the pit shown at A3 gives better tracking in some players than the "improved" pit shown at B3. This is primarily due to the fact that tapered ends, like the left side of the pit shown at A3, are rather pyramidal in shape, i.e. the sides of the tapered ends act as small mirrors which have a large effect on the amount of light being deflected to the side at which beam is off track, such that the slightest off track condition can be easily detected by the photo-detectors recovering such reflected light. With a blunted end and sharply defined pit such as that shown at B3, the angled mirrored surfaces are non-existent, and the light beam would have to wander laterally a greater distance before the tracking signal developed from the photo-detectors would recognize an off-track condition, if at all.

Further, while recording, as surface speed increases, the abrupt trailing edge of the pit shown at A3 becomes spread out lengthwise along the track, because the energy in the light beam transitions is integrated over a larger span of surface area. Also, at slower speeds, the surface is thermally affected to a greater extent for the same energy applied, e.g. the slower the surface speed the more the tapering of pits is exaggerated. These effects greatly upset duty cycle and asymmetry. Using the B1 waveform therefore requires an adjustment of duty cycle for each surface speed for best results.

A more ideal waveform for the modulator drive signal is shown at C1 in FIG. 3. Here, the initial steep rising edge of the pulse, if not too much greater in amplitude than normal, can give a controlled tapered end to the leading edge of the pit, i.e. something between a highly tapered end and an abrupt vertical wall. The fact that the trailing edge of the waveform in Line C1 of FIG. 3 is ramped means that the amplitude of waveform C1 can be varied quite easily resulting in a great effect on the leading edge of the pit while having only a small effect on the trailing edge, unlike the situation with waveforms A1 and B1 where an increase in overall amplitude could have a deleterious effect on the middle and end portions of the pit as a sacrifice for the increased amplitude of the leading edge. Of course, if the overall amplitude of waveform C1 is increased, the slope of the trailing edge may have to be adjusted to compensate, but the overall adjustment of the waveform parameters is much simpler than with either waveforms A1 or B1.

Moreover, since the trailing edge of waveform C1 produces an already tapered trailing end of the pits, there is not a lot of difference in duty cycle for different surface speeds as there is in using waveforms A1 and B1. Also, duty cycle can be adjusted by varying amplitude or slope of the trailing edge of waveform C1, whereas changing the pulse length is the only way to adjust duty cycle using waveforms A1 or B1.

As can be appreciated by the shape of waveform C1, a tapered end is formed at the leading edge of the pit (at C3) due to the controlled amplitude of the steep rising edge of the modulator drive signal, and the trailing edge of the pit is also tapered due to the sloping falling edge of the modulating drive signal passing through threshold less abruptly than the rectangular pulses of waveforms A1 and B1. If the amplitude, DC offset, and slope of the trailing edge of waveform C1 are properly adjusted, the pits formed in the disc would have the shape shown at C3 and would exhibit the desired moderately tapered ends, the desired duty cycle, good asymmetry, and improved resolution.

Figure 4:
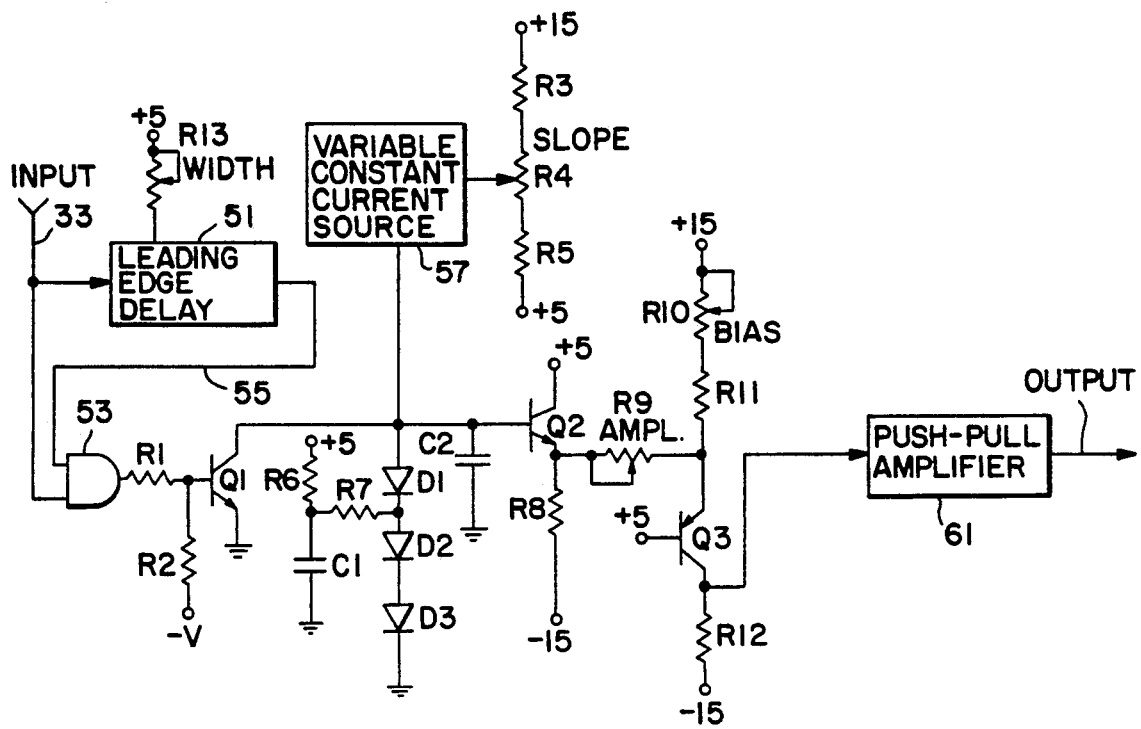
FIG. 4 is a combination block diagram and partial schematic of the waveform shaping circuit according to the present invention.

The input 33 in FIG. 4 is a rectangular waveform, which, in the prior art, would directly drive the optical modulator 11 (FIG. 1). The waveform shaping circuit of FIG. 4 operates on that input waveform to produce the waveform shown at C1 in FIG. 3.

FIG. 4 shows the waveform shaping circuit 31 (FIG. 1) whose function it is to provide a modified shaped modulator drive signal which has all of the characteristics mentioned earlier, i.e. the ability to provide higher peak power, good symmetry, the desired duty cycle, and tapered leading and trailing edges of the pits for improved tracking.

The circuit of FIG. 4 can, for convenience, be divided into two portions, the first portion creating a delayed leading edge of the input signal, and the second portion providing the appropriate wave shaping of the ultimate modulator drive signal output. In effect, controlling the amplitude and shape of the modulator drive signal controls the pit geometry needed by the players, i.e. the circuit of FIG. 4 is configured to produce a fairly wide pit with rounded tops, reasonably uniform depths, reasonably uniform widths between 3T length pits and 11T length pits, tapered (ellipsoidal) leading and trailing ends of the pits, good asymmetry, and a desired duty cycle.

Having increased the peak power at the leading edge of waveform C1 to improve resolution, it is necessary to reduce the resultant increased duty cycle back to about a 50% value. This is accomplished by delaying the leading edge of the input 33 a prescribed amount, e.g. for approximately 1¼T, but passing the trailing edge without delay.

Figure 5:
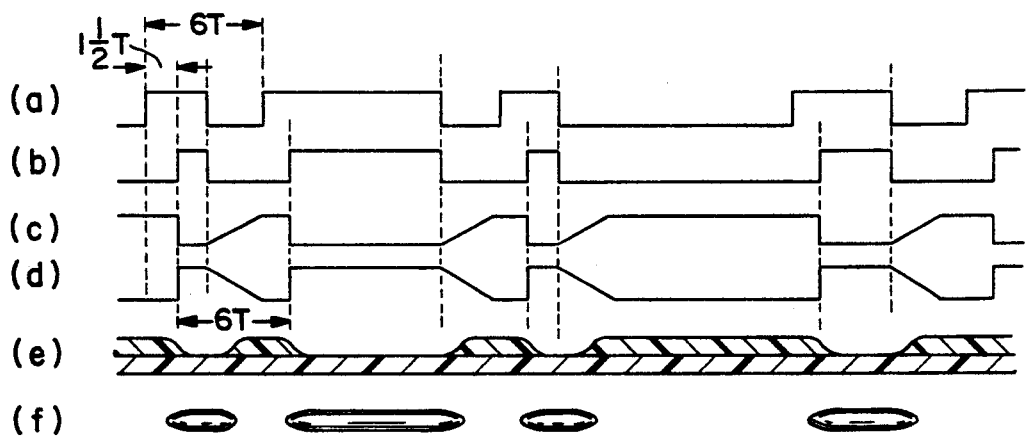
FIG. 5 illustrates the waveforms at various points in the circuit diagram of FIG. 4 as well as the effects such waveforms have on the recording medium.

The description of FIG. 4 will continue using the waveforms and disc geometry shown in FIG. 5 wherein waveform (a) is the rectangular input 33 having a variety of lengths of positive going and negative going waveform portions. In FIG. 5, the positive going portions create the pits, while the negative going portions define the lands in the ultimately recorded recording medium, although the reverse could work equally well depending on the requirements of the light modulator.

Pulse (a) in FIG. 5 is applied to leading edge delay circuit 51 which may be in the form of a monostable multivibrator triggered by the rising edge of waveform (a). The output of delay circuit 51 is applied to an AND gate 53 on line 55. The input waveform (a) is also applied as another input to AND gate 53. The output of AND gate 53 is shown as waveform (b) in FIG. 5. This pulse is applied through resistor R1 to the base of transistor Q1. Due to the delay imposed and the operation of AND gate 53, the effect on the input waveform (a) is to delay the rising leading edges and pass the falling trailing edges undelayed as clearly seen by comparing waveforms (a) and (b).

When waveform (b) is high, Q1 will be turned on, and the base of Q2 will be held to nearly ground potential as seen in waveform (c) of FIG. 5. When waveform (b) goes low, transistor Q1 turns off and its collector is permitted to rise due to current flowing from the adjustable constant current source to charge capacitor C2. The slope of the waveform at the base of Q2 is a ramp determined by the capacitance of capacitor C2 and the current of the current source 57. Although current source 57 is an adjustable current source, once set to a particular current by the setting of potentiometer R4, the current out of current source 57 is constant for that particular adjusted setting. Thus, capacitor C2 will charge at a linear rate.

Since the base of Q1 is clamped at its high point by the conduction of diodes D1, D2 and D3, the voltage at the base of Q1 will not exceed approximately 2.1 volts. Thus, the rising ramp on the base of Q2 hits a limit at the clamped level, and since Q2 is an emitter follower, the same waveform is developed across R8 at the emitter of Q2. This waveform (waveform (c)) is applied to the emitter of Q3 whose base is connected to the +5 volt power supply. Accordingly, the signal on the collector of Q3 is a non-inverted but amplified version of the waveform (c). The amplitude of the input to Q3 is adjusted by R9, and the DC offset or bias of the signal on the collector of Q3 is adjusted by R10 in a manner known to those skilled in that art.

The output of Q3 is applied to a push-pull amplifier 61 whose output becomes the shaped modulator drive signal having the characteristics shown in waveform (c). Depending upon the type of modulator and the arrangement of push-pull amplifier 61, the output could, alternatively, be inverted from that shown at (c) and have the waveform shown at (d) in FIG. 5 which is the waveform used in the illustrated example of FIG. 3.

FIG. 5 also shows at least one positive going portion and one negative going portion of waveform (a) having a length greater than 3T. The resultant waveforms (c) and/or (d) follow, however, from the description given above without any additional information being necessary.

As can be seen in FIG. 5, delaying the leading edge of the input rectangular waveform (a) maintains the rising edge-to-rising edge distance of waveform (d) and yet has the effect of shortening the time at which the waveform is higher than threshold so as to reduce the duty cycle (pit-to-land ratio). Effectively, the delay shortens the width of the portion of the ultimate modulator drive signal that exceeds threshold. The adjustment of the delay of monostable multivibrator 51 is shown as a WIDTH control in the form of potentiometer R13. The delay compensates for the fact that the trailing edge of waveform (c) or (d) slopes so as to maintain the waveform above threshold for a longer time than would the abrupt trailing edge of the input waveform (a). Also, as mentioned, when the peak power is increased it is necessary to shorten the width of the drive signal creating the pits in order to maintain a 50% duty cycle.

It should be noted that the signal processing scheme described above is not intended as a substitute for the writing beam intensity level stabilization and adjustment normally performed in the process of optically recording information. The need for those additional steps in order to achieve proper duty cycle of the recorded information and to minimize second harmonic distortion of the recorded information is discussed in the prior art and in particular in U.S. Pat. No. 4,225,873. A complete recording system preferably stabilizes the average intensity of the modulated beam relative to the threshold level of the recording medium in order to minimize the distortion of the recorded signal. Additionally, a complete system preferably varies the average writing beam power in direct proportion to the relative speed between the focussed writing spot and the recording medium due to the increasing volume of material to be altered with increasing speed.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

We claim:

1. A waveform shaping circuit for use in an optical recording apparatus which includes a writing light beam source and an optical modulator for modulating the intensity of the writing beam of light above and below a threshold level of a moving recording medium in response to a modulator drive signal for recording information on the medium, the light beam being capable of forming a track of surface effects in the moving recording medium when the writing beam is above the threshold and incapable of forming said track of surface effects in the moving recording medium when the writing beam is below the threshold, said waveform shaping circuit comprising:

delay means for receiving a substantially rectangular waveform having leading and trailing edges, provided as said modulator drive signal to modulate the writing beam, and for delaying said leading edges while passing said trailing edges undelayed; and waveform shaping means coupled to said delay means for producing a shaped modulator drive signal having steep leading edges reaching a first level sufficient to cause said writing beam to have an intensity above the threshold of the moving medium, and having ramped trailing edges changing amplitude at a prescribed rate to reach a second level sufficient to cause said writing beam to have an intensity below the threshold of the moving medium prior in time to the occurrence of the respective next leading edges of the received rectangular waveform.

2. The waveform shaping circuit as claimed in claim 1, wherein said trailing edges of said shaped modulator drive signal are linear.

3. The waveform shaping circuit as claimed in claim 1, wherein said waveform shaping means comprises means for varying the amplitude of said shaped modulator drive signal.

4. The waveform shaping circuit as claimed in claim 1, wherein said waveform shaping means comprises means for varying the average D.C. level of said shaped modulator drive signal.

5. The waveform shaping circuit as claimed in claim 1, wherein said waveform shaping means comprises means for varying the slope of the ramped trailing edges of said shaped modulator drive signal.

6. The waveform shaping circuit as claimed in claim 5, wherein said means for varying the slope of the ramped trailing edges of said shaped modulator drive signal comprises an adjustable constant current source.

7. The waveform shaping circuit as claimed in claim 1, wherein said delay means includes means for adjusting the delay of said leading edges by about $1\frac{1}{2}T$, where T is a fixed period of time defined in the rules for the EFM code standard in the recording and reproduction of information discs commonly known as compact discs.

8. The waveform shaping circuit as claimed in claim 1, wherein:

said surface effects are pits in a recording surface of said moving recording medium; and the delay of said delay means and the amplitude and shape of said shaped modulator drive signal produced by said waveform shaping means are selected so as to form pits in said moving recording medium, which in relation to the lands between such pits along a track of alternate pits and lands, have a prescribed duty cycle with said lands when said rectangular waveform received by said delay means is a square wave.

9. The waveform shaping circuit as claimed in claim 1, wherein, under the influence of said shaped modulator drive signal, the writing beam forms said surface effects in the form of pits in said moving recording medium, said pits having leading edges formed by the steep leading edges of said shaped modulator drive signal, and having trailing edges formed by the ramped trailing edges of said shaped modulator drive signal, to thereby form pits with symmetrical leading and trailing edges.

10. The waveform shaping circuit as claimed in claim 9, wherein said waveform shaping means comprises means for adjusting the amplitude, average D.C. level and trailing edge slope of said shaped modulator drive signal to thereby produce pits in said moving recording medium which are shaped and which have a prescribed duty cycle with lands between pits when said rectangular waveform received by said delay means is a square wave.

11. A waveform shaping circuit for use in an optical recording apparatus which includes a writing light beam source and an optical modulator for modulating the intensity of the writing beam of light above and below a threshold level of a moving recording medium in response to a modulator drive signal for recording information on the medium, the light beam being capable of forming surface discontinuities in the moving recording medium when the writing beam is above the threshold and incapable of forming surface discontinuities in the moving recording medium when the writing beam is below the threshold, said waveform shaping circuit comprising:

waveform processing means for receiving a substantially rectangular waveform, having leading and trailing edges, provided as said modulator drive signal to modulate the writing beam, and for producing a shaped modulator drive signal having steep leading edges reaching a first level sufficient to cause said writing beam to have an intensity above the threshold of the moving medium, and having ramped trailing edges changing amplitude at a prescribed rate to reach a second level sufficient to cause said writing beam to have an intensity below the threshold of the moving medium prior in time to the occurrence of the respective next leading edges of the received rectangular waveform.

12. The waveform shaping circuit as claimed in claim 11, wherein said trailing edges of said shaped modulator drive signal are linear.

13. The waveform shaping circuit as claimed in claim 11, wherein said waveform processing means comprises means for varying the amplitude of said shaped modulator drive signal.

14. The waveform shaping circuit as claimed in claim 11, wherein said waveform processing means comprises means for varying the average D.C. level of said shaped modulator drive signal.

15. The waveform shaping circuit as claimed in claim 11, wherein said waveform processing means comprises means for varying the slope of the ramped trailing edges of said shaped modulator drive signal.

16. The waveform shaping circuit as claimed in claim 15, wherein said means for varying the slope of the ramped trailing edges of said shaped modulator drive signal comprises an adjustable constant current source.

17. The waveform shaping circuit as claimed in claim 11, further comprising:

delay means coupled to said waveform processing means for receiving said substantially rectangular waveform having said leading and trailing edges, provided as said modulator drive signal to modulate the writing beam, and for delaying said leading edges while passing said trailing edges undelayed; and wherein said delay means includes means for adjusting the delay of said leading edges by about 1¼T, where T is a fixed period of time defined in the rules for the EFM code standard in the recording and reproduction information discs commonly known as compact discs.

18. The waveform shaping circuit as claimed in claim 11, further comprising delay means coupled to said waveform processing means for delaying said leading edges while passing said trailing edges undelayed; and wherein the delay of said delay means and the amplitude and shape of said shaped modulator drive signal produced by said waveform processing means are selected so as to form pits in said moving recording medium, which in relation to the lands between such pits along a track of alternate pits and lands, have a prescribed duty cycle with said lands when said rectangular waveform received by said waveform processing means is a square wave.

19. The waveform shaping circuit as claimed in claim 11, wherein, under the influence of said shaped modulator drive signal, the writing beam forms pits in said moving recording medium, said pits having leading edges formed by the steep leading edges of said shaped modulator drive signal, and having trailing edges formed by the ramped trailing edges of said shaped modulator drive signal, to thereby form pits with symmetrical leading and trailing edges.

20. The Waveform shaping circuit as claimed in claim 19, wherein said waveform processing means comprises means for adjusting the amplitude, average D.C. level, and trailing edge slope of said shaped modulator drive signal to thereby produce pits in said moving recording medium which are shaped and which have a prescribed duty cycle with lands between pits when said rectangular waveform received by said waveform processing means is a square wave.

21. A waveform shaping circuit for use in an optical recording apparatus which includes a writing light beam source and an optical modulator for modulating the intensity of the writing beam of light above and below a threshold level of a moving recording medium in response to a modulator drive signal for recording information on the medium, the light beam being capable of forming a track of surface effects in the moving recording medium when the writing beam is above threshold and incapable of forming said track of surface effects in the moving recording medium when the writing beam is below threshold, said waveform shaping circuit comprising:

means for receiving a substantially rectangular waveform having leading and trailing edges, provided as said modulator drive signal to modulate the writing beam to a peak power above threshold and to a minimum power level below threshold, respectively; and waveform shaping means coupled to said receiving means for producing a shaped modulator drive signal which increases the peak power of the writing beam responsive to the occurrence of said leading edges, decreases the time said shaped modulator drive signal is above the threshold to maintain a prescribed duty cycle in the track of surface effects in the moving recording medium, and produces a symmetrical geometry at the leading and trailing edges of said track of said surface effects.

22. A method for improving the characteristics in the indicia recorded on an optical disc, for use with an optical recording apparatus which includes a writing light beam source and an optical modulator for modulating the intensity of the writing beam of light above and below a threshold level of a moving recording medium in response to a modulator drive signal for recording information on the medium, the light beam being capable of forming a track of surface effects in the moving recording medium when the writing beam is above the threshold and incapable of forming said track of surface effects in the moving recording medium when the writing beam is below the threshold, said method comprising the steps of:

receiving a substantially rectangular waveform having leading and trailing edges, provided as said modulator drive signal to modulate the writing beam; and producing a shaped modulator drive signal having steep leading edges reaching a first level sufficient to cause said writing beam to have an intensity above the threshold of the moving medium, and having ramped trailing edges changing amplitude at a prescribed rate to reach a second level sufficient to cause said writing beam to have an intensity below the threshold of the moving medium prior in time to the occurrence of the respective next leading edges of the received rectangular waveform.

23. The method as claimed in claim 22, including adjusting the width of the portion of said shaped modulator drive signal which, is above threshold, adjusting the slope of said ramped trailing edges, and adjusting the amplitude and D.C. offset of said shaped modulator drive signal to produce surface effects in said recording medium which have a prescribed duty cycle with areas between said surface effects along said track and which have geometric symmetry in the leading and trailing edges of said track of said surface effects.

24. A method for improving the characteristics in the indicia recorded on an optical disc, for use with an optical recording apparatus which includes a writing light beam source and an optical modulator for modulating the intensity of the writing beam of light above and below a threshold level of a moving recording medium in response to a modulator drive signal for recording information on the medium, the light beam being capable of forming a track of surface effects in the moving recording medium when the writing beam is above threshold and incapable of forming said track of surface effects in the moving recording medium when the writing beam is below threshold, said method comprising the steps of:

receiving a substantially rectangular waveform having leading and trailing edges, provided as said modulator drive signal to modulate the writing beam to a peak power above threshold and to a minimum power level below threshold, respectively; and producing a shaped modulator drive signal by increasing the peak power of the writing beam responsive to the occurrence of said leading edges, decreasing the time said shaped modulator drive signal is above threshold to maintain a prescribed duty cycle in the track of surface effects in the moving recording medium, and producing a symmetrical geometry at the leading and trailing edges of said track of said surface effects.

* * * * *